July 6, 1948. J. H. WEED 2,444,866
CHAIN JACK AND TIGHTENER
Filed Aug. 13, 1946
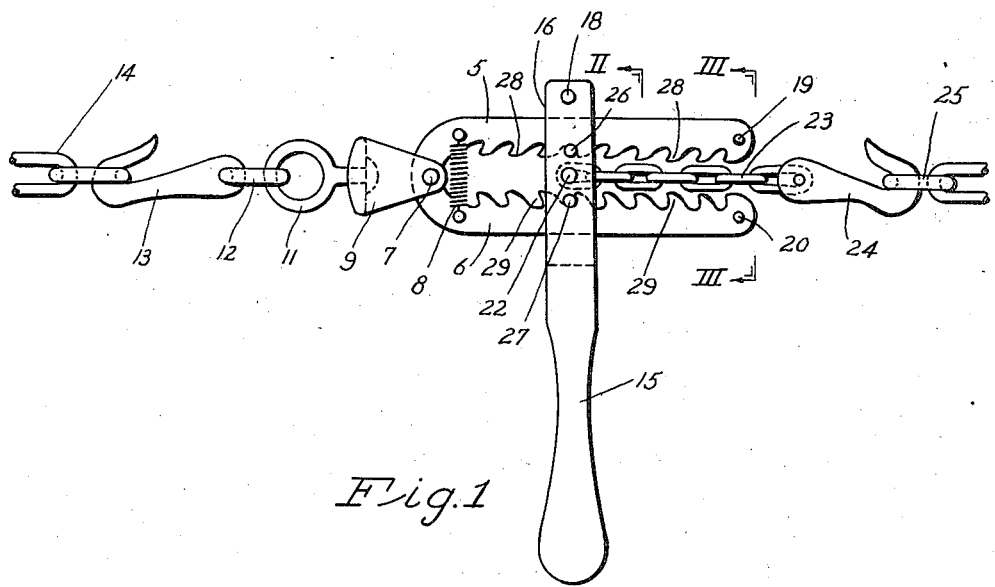
Fig. 1
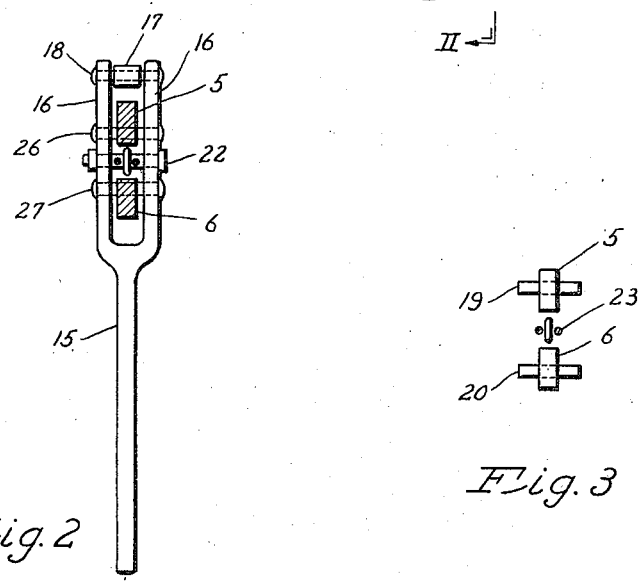
Fig. 2
Fig. 3
INVENTOR
JOHN H. WEED
BY Archworth Martin
ATTORNEY Patented July 6, 1948

2,444,866

UNITED STATES PATENT OFFICE 2,444,866

CHAIN JACK AND TIGHTENER

John H. Weed, West Sunbury, Pa., assignor of one-half to Samuel Patten, Butler, Pa.

Application August 13, 1946, Serial No. 690,236

2 Claims. (Cl. 254—72)

This invention relates to devices for exerting pulling or lifting forces, and is particularly useful in connection with chains or ropes as a stretcher, load binder, etc.

The invention has for its object the provision of a jack device that is of simple form, light weight, and which is manually operable to produce great pulling or lifting forces.

Figure 1 is a side view of the chain tightener or jack; Fig. 2 is a view taken on the line II—II of Fig. 1, and Fig. 3 is a view taken on the line III—III of Fig. 1.

The device comprises a pair of side bars or arms 5 and 6 that have rack teeth formed on their inner opposed edges. The bars are pivotally connected at 7 and are yieldably drawn toward one another by a spring 8. A block 9 is pivotally connected to the pin 7 and carries a swivel eye 11 which, through a link 12, is connected to a hook 13 that will have engagement with a link of a chain 14.

A lever 15 is forked at 16, these fork elements being disposed along the sides of the bars 5—6. The outer end of the work is closed by a spacer block 17 and a rivet 18 extends through the fork and the block. Studs 19 and 20 are provided on the outer ends of the bars 5—6 to retain the lever in place on the bars.

A bolt 22 extends through the fork members 16 and through the inner end link of a chain 23. The outer end of the chain 23 is connected to a hook 24 that is, in turn, engageable with a link 25 of a chain, which may be the other end of the chain 14 or a different chain.

Pins or studs 26 and 27 extend through the fork elements 16 to function as pawls for engagement with teeth 28 and 29 respectively on the bars 5 and 6.

With the hooks 13 and 24 each engaging a chain link as shown in Fig. 1, a tightening or jacking operation to draw the hooks 13—24 toward each other is effected by oscillating the lever 15. Thus, if the lever is swung in a clockwise direction from the position shown in Fig. 1, it will fulcrum on the pin 26 which will remain seated against one of the teeth 28, the pin 27 moving along the bar 6 past the next tooth 29. Thereupon, swinging of the lever 15 in a counterclockwise direction will cause it to fulcrum about the axis of the pin 27 and move the pin 26 to the left past the next tooth 28. The spring 8 will then snap the bar 5 inward so that the pin 26 can be engaged and held by the adjacent tooth 28. Continued oscillation of the lever in this manner will effect step-by-step tightening of the chain.

In order to relieve the tension on the chain, the lever will be swung in a direction to disengage one of the pins 26 or 27 from engagement with a bar tooth, whereupon that bar can be manually pushed outward against the tension of the spring 8, which outward movement can conveniently be effected by grasping one of the studs 19—20. While the bar is so held, the lever will be swung in the opposite direction, to move the disengaged pin 26 or 27 toward the outer end of the bar. Thereupon, the last-named bar will be released to engage the pin and the lever will be swung in a direction to release the other bar from the other pin so that the other bar can be swung outward against the spring tension and allow the latter-named pin to be moved to another tooth nearer the outer end of the bars. Such movements are continued until the desired degree of slackness is attained and the hooks disengaged from their respective links.

I claim as my invention:

1. A jack device comprising a pair of laterally-spaced bars pivotally connected together by a pin at one end of the device and having rows of teeth along their opposed edges, a spring yieldably urging the free ends of the bars toward each other, a block carried by said pin and having means thereon for connecting the pivoted ends of the bars to an element to be pulled, a forked lever partly embracing the bars and extending transversely thereof entirely across them and with the forked extremities closed, a pin carried by the forks of the lever at a point between the said bars, for connection thereto of a second element to be pulled, and other pins carried by the lever forks at opposite sides of the second-named pin, each in position to engage the teeth of the adjacent bar, whereby the said other pins may serve as pawls, the teeth being of hooked form and pointed toward the said pivoted end.

2. A jack device comprising a pair of laterally-spaced bars pivotally connected together by a pin at one end of the device and having rows of teeth along their opposed edges, a spring yieldably urging the free end of the bars toward each other, a block carried by said pin and having means thereon for connecting the pivoted ends of the bars to an element to be pulled, a forked lever partly embracing the bars and extending transversely thereof entirely across them and with the forked extremities closed, a pin carried by the forks of the lever at a point between the said bars, a pulling element extending between the free ends of the bars and connected to the second-named pin, and other pins carried by the lever forks at opposite sides of the second-named pin, each in position to engage the teeth of the adjacent bar, whereby the said other pins may serve as pawls, the teeth being of hooked form and pointed toward the said pivoted end.

JOHN H. WEED.

REFERENCES CITED

The following references are of record in the file of this patent:

UNITED STATES PATENTS

| Number | Name | Date |
|---|---|---|
| 688,240 | Engle | Dec. 3, 1901 |
| 1,155,049 | Darby | Sept. 28, 1915 |
| 1,204,076 | Schmoeger | Nov. 7, 1916 |
| 1,681,370 | Seeger | Aug. 21, 1928 |